United States Patent [19]

Maruta

[11] 4,392,234
[45] Jul. 5, 1983

[54] PCM SIGNAL INTERFACE APPARATUS

[75] Inventor: Rikio Maruta, Tokyo, Japan

[73] Assignee: Nippon Electric Co., Ltd., Tokyo, Japan

[21] Appl. No.: 261,923

[22] Filed: May 8, 1981

[30] Foreign Application Priority Data

May 16, 1980 [JP] Japan .................................. 55-64016

[51] Int. Cl.³ .............................................. H04L 7/08
[52] U.S. Cl. ...................................... 375/118; 370/84; 370/108
[58] Field of Search ................. 375/118, 25, 106, 114; 370/105, 100, 49, 91, 106, 108, 84, 41, 109, 110.1, 110.4; 369/60, 174, 175; 360/26, 36, 51; 371/47, 42, 46, 57; 358/19; 364/200 MS File, 900 MS File

[56] References Cited

U.S. PATENT DOCUMENTS

| 3,426,153 | 2/1969 | Kitsopoulos | 370/108 X |
| 3,742,139 | 6/1973 | Beehly et al. | 178/69.5 |
| 3,809,820 | 5/1974 | Sullivan | 370/100 X |
| 4,107,470 | 8/1978 | Maruta | 179/15 |

Primary Examiner—Robert L. Griffin
Assistant Examiner—Albert W. Watkins
Attorney, Agent, or Firm—Blakely, Sokoloff, Taylor & Zafman

[57] ABSTRACT

A PCM signal interface apparatus comprises a buffer memory being capable of asynchronously writing and reading a PCM signal, means for inserting a frame marker to the PCM signal upon writing the PCM signal into the buffer memory, means for judging whether or not the frame marker is contained in an output signal read out of the buffer memory at a time that is designated by an external read frame position designating pulse, means for resetting all the contents in the buffer memory and temporarily stopping the supply of a writing clock and a reading clock to the buffer memory when the frame marker is not delivered out at the predetermined time, means for resuming the supply of the writing clock to the buffer memory by receiving a write frame position designating pulse, and means for resuming the supply of the reading clock to the buffer memory by receiving the frame position designating pulse at a predetermined time lapse after the resumption of the writing clock supply. The data written into the buffer memory can be read out at a desired frame phase and data speed without duplication and missing of the read data.

5 Claims, 7 Drawing Figures

PCM SIGNAL INTERFACE APPARATUS

BACKGROUND OF THE INVENTION

The present invention relates to a PCM (pulse code modulation) signal interface apparatus, particularly, to a PCM signal interface apparatus having capability of synchronizing a PCM reception signal to the phases of the clock and frame in a signal processing terminal equipment and extracting and separating signaling information from the PCM reception signal.

In order to realize a signal processing terminal equipment such as a TDM/FDM converter (transmultiplexer) which interconnects time division multiplexed (TDM) PCM signals and single side-band (SSB) frequency division multiplexed (FMD) signals directly by digital signal processing, an interface apparatus for the PCM reception signals is required. The interface apparatus needs to have the following functions:

(1) Even if the clock frequency of a PCM terminal equipment which transmits a PCM signal is in synchronization with the clock frequency of a signal processing terminal equipment which receives the PCM signal, the bit phase between the clock signal of the signal processing terminal equipment and the PCM reception signal varies at random due to the jitters created during transmission. Moreover, transmission lines can vary their delay characteristics due to temperature variation. Therefore, it is required to absorb the phase difference caused by the jitters and delay variations.

(2) Even if the clock signals of both terminals are in synchronism, their timing counters are not always initialized identically, resulting in an inconsistent phase relationship between frames of a PCM reception signal and the reference time frame of a signal processing terminal. Therefore, frame alignment between them must be matched before signal processing.

(3) In a signal processing terminal, the number of data samples within one frame is sometimes required to be larger than the number of channels or words in the PCM reception signal for the sake of convenience of internal signal processing or for other reasons, and data samples need to be converted into linear codes with a large number of bits, resulting in a requirement for changing the clock rate and the frame format.

(4) It is often desired to change the channel alignment order within a frame.

(5) A PCM signal contains signaling information in addition to voice information. The signaling information is transmitted by stealing the least significant bit (LSB) of the voice sample transmitting code words every n-th frame where n is a predetermined positive integer, with the LSB being eliminated once a few frames. Therefore, PCM signal contains multi-frame synchronization information that indicates a frame carrying signaling information. Using the multi-frame synchronization information, the signaling information must be extracted, and the extracted low-speed signaling samples must be interpolated so as to provide the same frame format as that of voice samples for enabling the process in the signal processing terminal.

In order to realize digital networks, various frame aligner systems which satisfy the above-mentioned requirements (1) and (2) have been proposed. However, interface apparatus which satisfy all of the above-mentioned requirements (1)–(5) have not been developed yet.

SUMMARY OF THE INVENTION

It is an object of the present invention to provide a PCM signal interface apparatus capable of performing bit and frame alignment between PCM reception signal and reference signal by means of a simple circuit arrangement.

Another object of the invention is to provide a PCM signal interface apparatus capable of extracting and separating signaling information from a PCM reception signal.

Another object of the present invention is to provide a PCM signal interface apparatus, wherein a single buffer memory is commonly used for synchronizing voice samples and signaling information to desired phases of the clock and the frame, and also extraction and separation of signaling information and signaling-interpolation are carried out by the memory having the same address control information as that of the voice channel alignment conversion memory, whereby the apparatus size and cost can be reduced.

According to general aspect of the invention, there is provided a PCM signal interface apparatus comprising:

a buffer memory being capable of asynchronously writing and reading a PCM signal;

means for inserting a frame marker to the PCM signal upon writing the PCM signal into said buffer memory;

means for judging whether or not the frame marker is contained in an output signal read out of said buffer memory at a time that is designated by an external read frame position designating pulse;

means for resetting all the contents in said buffer memory and temporarily stopping the supply of a writing clock and a reading clock to said buffer memory when the frame marker is not delivered out at the predetermined time;

means for resuming the supply of the writing clock to said buffer memory by receiving a write frame position designating pulse; and means for resuming the supply of the reading clock to said buffer memory by receiving the frame position designating pulse at a predetermined time lapse after the resumption of the writing clock supply, whereby the data written into said buffer memory can be read out at a desired frame phase and data speed without duplication and missing of the read data.

DESCRIPTION OF PREFERRED EMBODIMENTS

A PCM signal interface apparatus according to the present invention will now be described in detail with reference to the accompanying drawings. The following description is based on the assumption that a 24-channel PCM signal with a clock rate of 1.544 Mb/s is received and it is converted into a parallel PCM signal in 28 time slots per frame with parallel signaling information having the same frame format.

Figure 1:
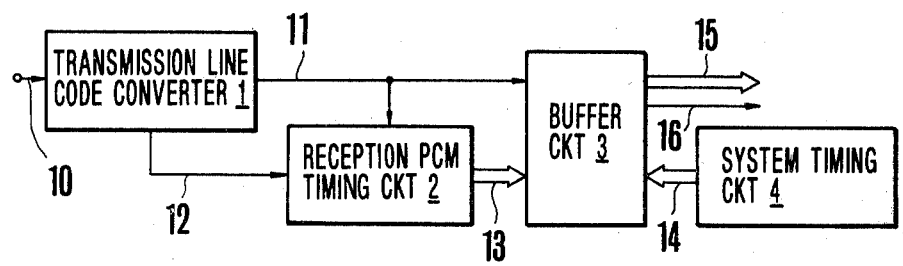
FIG. 1 is a block diagram showing the overall construction of a PCM signal interface apparatus embodying the present invention.

FIG. 1 illustrates the overall arrangement of the PCM signal interface apparatus embodying the present invention, in which a transmission line code converter 1 receives a bipolar PCM reception signal on an input signal line 10 and provides a unipolar PCM signal 11 and a clock signal 12 to a reception PCM timing circuit 2. A PCM timing signal 13 produced by the reception PCM timing circuit 2 and the unipolar PCM signal 11 are delivered to a buffer circuit 3, which produces a frame-synchronized PCM signal 15 and frame-synchronized signaling information 16 using system timing signals 14 from a system timing circuit 4.

Figure 2:
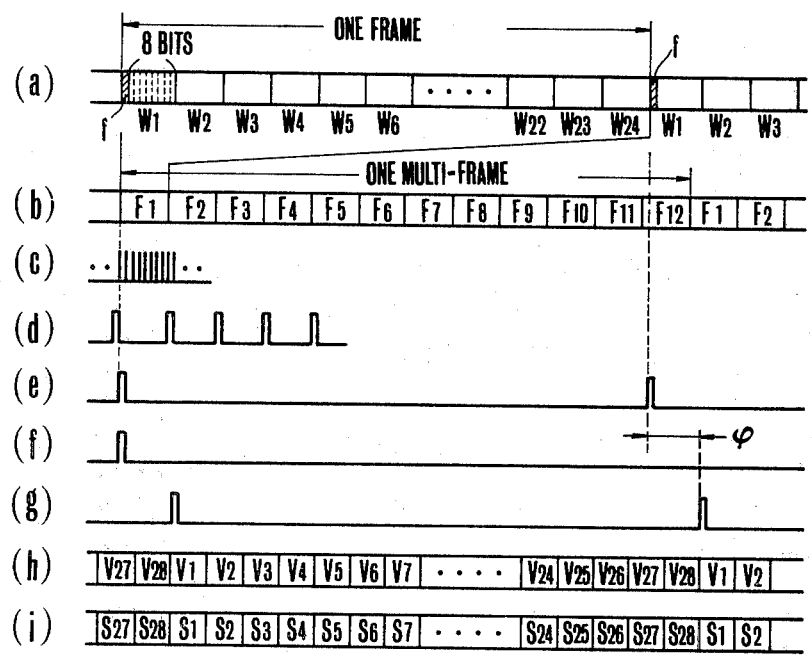
FIG. 2 is a timing chart useful in explaining the operation of the apparatus of FIG. 1.

FIG. 2 illustrates in sections (a) and (b) the frame format of a 1.544 Mb/s 24-channel PCM signal. One frame consists of 193 bits including twenty-four 8-bit channels W1, W2, W3, . . . and W24 and a 1-bit frame pulse, and one multi-frame consists of 12 frames. FIG. 2 illustrates in section (c) the clock signal 12 extracted from the PCM reception signal by the transmission line code converter 1 whose clock signal is a 1.544 Mb/s clock synchronized to the unipolar PCM signal 11. The reception PCM timing circuit 2 comprises a counter for dividing the clock rate by 193, a counter for dividing the frame period pulse rate (8 kHz) derived from the first mentioned counter by 12 and a frame synchronizing circuit, producing the word pulse which specifies the word position as shown at section (d) in FIG. 2, the frame pulse which specifies the frame position as shown at section (e) in FIG. 2 and the multi-frame pulse which specifies the multi-frame position as shown at section (f) in FIG. 2. The role of the frame synchronizing circuit is to match the phases of the frame and multi-frame pulses to the frame and multi-frame phases of the unipolar PCM signal 11, and synchronization is carried out by checking the bit pattern of 12 f-pulses in one multi-frame, each frame including one bit f-pulse.

The unipolar PCM signal is written to the buffer circuit 3 using the PCM timing signals 13 shown at sections (c) through (f) in FIG. 2. The system timing circuit 4 supplies the system frame pulse shown at (g) in FIG. 2 and various system timing signals 14 to the buffer circuit 3, so that the frame-synchronized PCM signal 15 as shown at (h) in FIG. 2 and the frame-synchronized signaling information 16 as shown at (i) in FIG. 2 are read out of the buffer circuit 3. The frame-synchronized PCM signal 15 is read out as an 8-bit parallel signal for each of 28 time slots in one frame. Information of the PCM reception signal is contained in the predetermined 24 time slots out of 28 time slots.

In the arrangement of FIG. 1, the transmission line code converter 1 and the reception PCM timing circuit 2 are employed in general PCM signal receiving terminal equipments and are well known in this field of art, thus their detailed description will be omitted here. The buffer circuit 3 and the system timing circuit 4 will be described in detail as follows.

Figure 3:
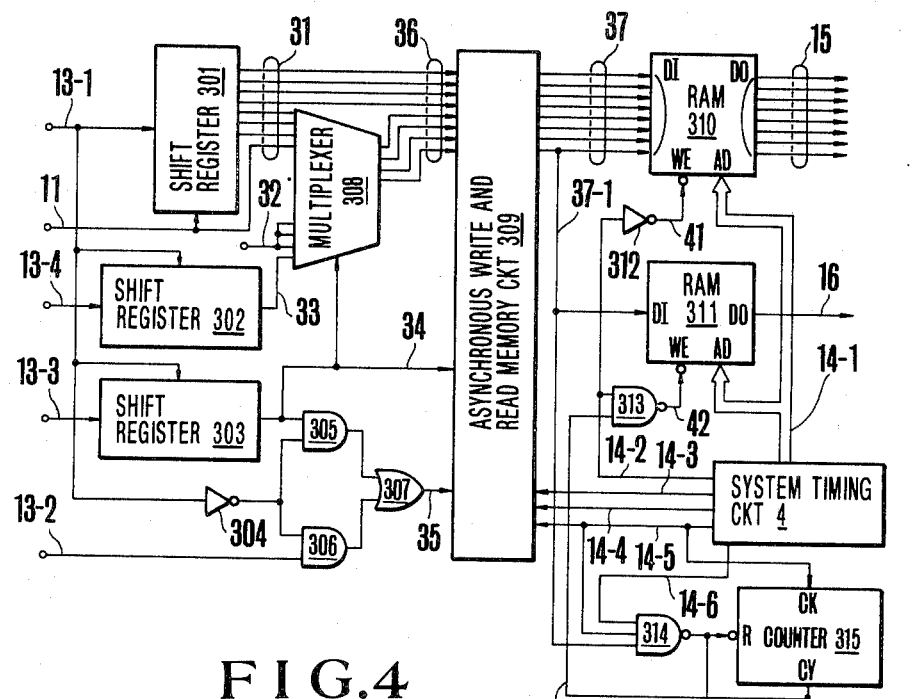
FIG. 3 is a circuit diagram showing details of a buffer circuit and its connection to a system timing circuit in FIG. 1.
Figure 4:
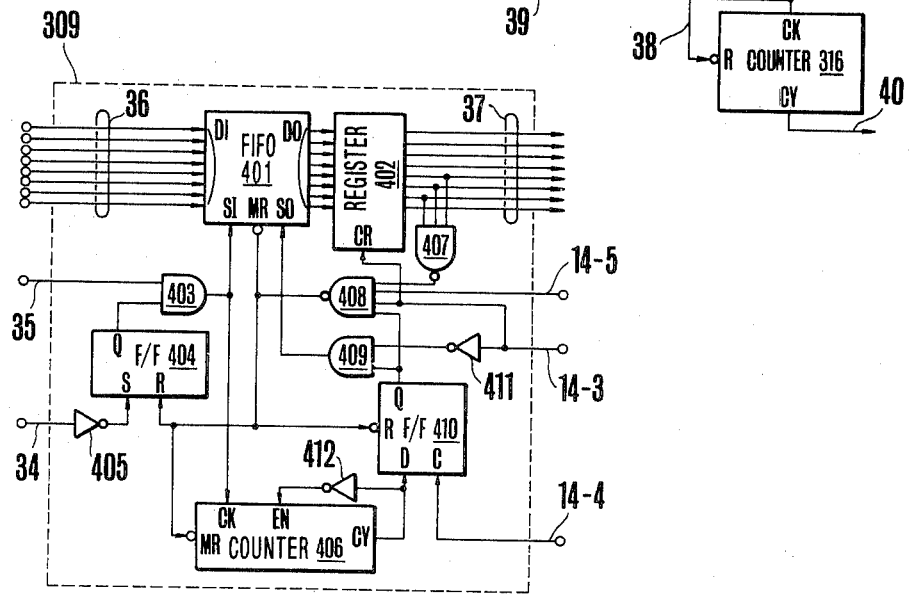
FIG. 4 is a circuit diagram showing details of an asynchronous write and read memory circuit in the buffer circuit.

FIG. 3 shows details of the buffer circuit 3 and its connection to the system timing circuit 4. In FIG. 3, reference numbers 4, 11, 15 and 16 correspond to those in FIG. 1, and reference numbers 13-1 through 13-4 and 14-1 through 14-6 are derived from reference numbers 13 and 14 in FIG. 1, respectively. The buffer circuit 3 consists of shift registers 301, 302 and 303; inverters 304 and 312; AND gates 305 and 306; an OR gate 307; a multiplexer 308; an asynchronous write and read memory circuit 309; random access memories 310 and 311; NAND gates 313 and 314; and counters 315 and 316. The asynchronous write and read memory circuit 309 further consists of a buffer memory 401 in the form of a first-in first-out (FIFO) memory; a register 402; AND gates 403 and 409; flip-flops 404 and 410; inverters 405, 411 and 412; a counter 406; and NAND gates 407 and 408, as shown in FIG. 4.

Figure 5:
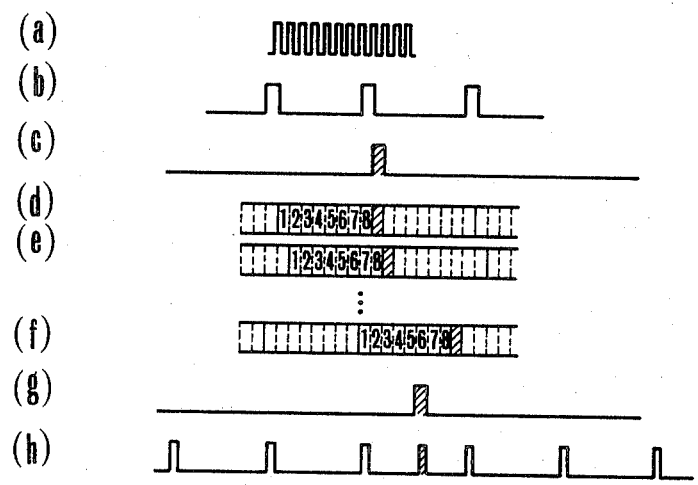
FIGS. 5 and 6 are timing charts useful in explaining the operation of the circuit arrangements shown in FIGS. 3 and 4.
Figure 6:
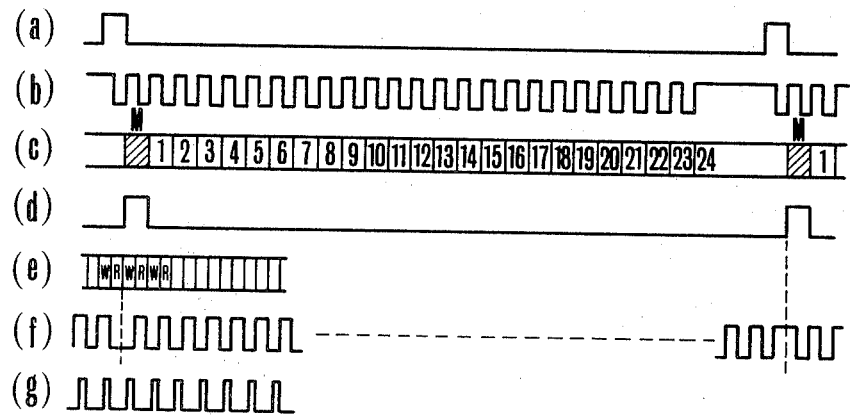

FIGS. 5 and 6 are timing charts showing the write and read operations of the asynchronous write and read memory circuit 309, respectively. In FIG. 3, the shift registers 301, 302 and 303, and the inverter 304 are supplied with the 1.544 Mb/s clock signal shown at (a) in FIG. 5 over the signal line 13-1. The work pulse shown at (b) in FIG. 5 is supplied over the signal line 13-2, and the frame and multi-frame pulses are supplied over the signal lines 13-3 and 13-4, respectively. FIG. 5 shows in section (c) the frame pulse. The multi-frame pulse appears once per 12 frames in the same time point as that of the frame pulse. The unipolar PCM signal shown at (d) in FIG. 5 is delivered over the signal line 11 to the shift register 301, which shifts the contents each time a bit of signal is entered as shown at sections (e) and (f) in FIG. 5, and then a code of 8 bits representing one word is then produced in parallel on a signal lines 31. The frame and multi-frame pulses are delayed by 4 bits by the shift registers 303 and 302, respectively, and a pulse as shown at (g) in FIG. 5 appears on signal lines 34 and 33. This delay is to eliminate the necessity of excessively high write-in speed in connection with the asynchronous write and read memory circuit. The multiplexer 308 conducts the lower four input signals to its output only at the timing of the frame pulse on the signal line 34, otherwise it conducts the upper four input signals to its output. Since the signal line 32 is fixed to logical "1" and the signal line 33 is supplied with a multi-frame pulse, a 4-bit marker signal is produced once a frame on the lower four lines of signal lines 36. The marker signal becomes "1111" only for one frame within one multi-frame consisting of 12 frames, and becomes "1110" for remaining 11 frames. The combination of the AND gates 305 and 306 and the OR gate 307 produces a pulse train as shown at (h) in FIG. 5 on a signal line 35. The asynchronous write and read memory circuit 309 writes in data on a signal line 36 using the pulses on the signal line 35 as the write-clock, and thus 8-bit data for 24 words or channels are written and at the same time the above-mentioned marker signal is written by a pulse which is shown by hatching at section (h) in FIG. 5. Consequently, 24 sets of 8-bit data plus 4-bit marker are written in one frame. Although the shift registers 302 and 303 are assumed to have 4 bits in this embodiment, the number of bits can be selected arbitrarily in the range from 0 to 7. Preferably, the shift registers have 3 or 4 bits so as to maximize the writing clock interval.

The asynchronous write and read memory circuit 309 is read by application of the read-clock shown at (b) in FIG. 6 supplied over the signal line 14-3 from the system timing circuit 4 (including a clock generator and a clock rate divider) and the frame sync pulses as shown at sections (a) and (d) in FIG. 6 supplied over the signal lines 14-4 and 14-5, respectively. Since 25 words of data including 24 reception data words and a 1 marker code signal are written in one frame, the read-clock pulse consists of 24 pulses per frame for the read-out frame format having 28 time slots per frame, as shown at (b) in FIG. 6. Output data as shown at (c) in FIG. 6 appears on the signal lines 37 in synchronization with the leading edge of the clock pulse. By the function of the asynchronous write and read memory circuit 309 to be described in greater detail with reference to FIG. 4, the marker signal appears in a time slot M as shown by hatching at section (c) in FIG. 6 and data for channels 1 through 24 will ensue.

Data on a signal line 37 is written to the random access memory 310 through a data input port DI. In some applications, data is subjected to change in the channel alignment order by changing the alignment order of write and read addresses within one frame and sent out from a data output port DO over the signal line group 15.

FIG. 6 illustrates in sections (e) and (f) timing charts of the address signal supplied to an address input AD of the random access memory 310. In order to provide the single random access memory 310 with write and read functions as realized by two independent memories, each time slot of input data is divided into two, and a write address (shown by W) is given to the first half and a read address (shown by R) is given to the second half of each time slot. FIG. 6 shows in section (e) time position for an address signal comprising five parallel bits, and FIG. 6 shows in section (f) a signal for switching write and read operations for each frame and it is used to designate the address. Because of the total 6-bit address signal, there are provided $2^6 = 64$ (0, 1, 2, ... 63) binary states. Thus, for example, using this signal (f) as the MSB of the address, when address of 31 (middle state) or lower are used for writing and addresses of 32 or higher are used for reading in an odd of even number frames, addresses of 31 or lower are used for reading and addresses of 32 or higher are used for writing in an even or odd number frames. In this manner, the single RAM 310 functions equivalently to a pair of memories which operate to write and read data alternately so as to interchange the alignment of channels within a frame. A write enable signal is supplied through the inverter 312 to a write enable input (WE) of the random access memory 310 at the write address time slot.

The random access memory 311 is supplied with the same address signal, so that signaling information is extracted and separated and sampling-interpolation is carried out. Interpolation herein is to produce a number of signalings for each frame even though the signaling information is received once per six frames. Such an interpolation is necessary in an application wherein an FDM (frequency division multiplex) converter not shown is coupled to the signal line 16.

For interpolation, the random access memory 311 is supplied at its data input port DI with the LSB of the output of the asynchronous write and read memory circuit 309 over a signal line 37-1. In the 24-channel PCM system, one multi-frame is made up of 12 frames, and the LSB of 8-bit data for each channel in one frame out of six frames is allocated to signaling information and received as mentioned above. A signal line 39 goes "1" only for frames containing signaling information and, consequently, the NAND gate 313 transmits the write enable signal on a signal line 42 so that data is written. Accordingly, the random access memory is updated every six frames, with remaining five frames being unchanged and the same contents read out repeatedly. As a result, the same signaling information is read out consecutively for six frames and the sampling-interpolation is carried out.

Sampling the frames which contain signaling information is realized by resetting the counter 315 by the multi-frame marker. The counter 315 is a counter which divides the rate of the frame sync pulse on the signal line 14-5 by six, producing the count of 0, 1, 2, ... 5, 0, 1, and so on in each frame, and it makes the signal line 39 "1" when the count is 5. On the other hand, the LSB of the marker signal time slot shown at (c) in FIG. 6 has been incorporated with the multi-frame marker through the multiplexer 308, and "1" should take place every 12 frames. The NAND gate 314 extracts the multi-frame marker from the signal line 37-1 using the marker pulse shown at (d) in FIG. 6 on the signal line 14-5 and the clock signal supplied from the system timing circuit 4 over the signal line 14-6, causing a signal line 38 to become "0" over 12 frames so that the counters 315 and 316 are reset to "0" or preset to a certain value. Consequently, even if the counter 315 fails to synchronize to the correct multi-frame phase, it is forced to synchronize within a duration of 12 frames. The counter 316 indicates whether signaling information appearing twice within a multi-frame resides in the former or latter half of the multi-frame, and sends out the identification signal over a signal line 40.

In FIG. 4, the asynchronous write and read memory circuit 309 comprises the buffer memory 401 in the form of a FIFO memory which can be realized using two 64 words by 4 bits FIFO memories available, for example, from Monolithic Memories Inc., U.S.A., connected in parallel to form a 64 words by 8 bits memory. The FIFO memory 401 writes data at a data input port DI when a write-clock is given at a shift input terminal SI, and reads out the contents in a first-in first-out fashion onto a data output port DO when a read-clock is given to a shift output terminal SO. The write-clock and read-clock need not be synchronized with each other. The memory is cleared when a reset signal is given to a reset terminal MR. In the PCM signal interface apparatus as embodied by this invention, the PCM reception signal and the system timing frame phase may have a phase difference $\phi$ (see (f) in FIG. 2) of one frame length at maximum, and the FIFO memory 401 needs to have a capacity of at least one frame length. Some marginal capacity is required for absorbing the jitters, the difference of the read and write speeds and for insertion of the marker bits. A capacity of 64 words is considered sufficient.

The write and read timings of the FIFO memory 401 are controlled by reversing the clock on the signal line 35 and the clock on the signal line 14-3. That is, the read-clock is formed by reversing the clock shown at (b) in FIG. 6, and data at the data output port DO of the FIFO memory 401 is read into the register 402 at the leading edge of the clock shown at (b) in FIG. 6 while the read-clock is "1". The read out data is sent out over the output signal line 37 in a format shown at (c) in FIG. 6.

The rest of the circuit in FIG. 4 is used to control the synchronization of the FIFO memory output to the system timing frame phase.

In operation, the NAND gate 407 first detects the frame marker which has been inserted to the head of the frame by the data multiplexer 308 shown in FIG. 3 and checks if the frame marker detected by the NAND gate 407 coincides with the system timing frame position. Namely, the NAND gate 407 acts as a code detector which is alternatively realized by a comparator, for example. If the phase relationship is not met, a proper operation will be started to match the phases.

More particularly, at the frame marker position, "1"s are inserted to the fifth, sixth and seventh bits, and the NAND gate 407 always outputs "0" at the marker position. However, in other time slots, it does not always output "0", but more probably will output "1". When the NAND gate 407 outputs "0" with the system frame signal on the signal line 14-5 being "1", the output of the NAND gate 408 is kept "1" indicating the correct frame phase, and no further operation for correcting the phase relationship will proceed. However, if the NAND gate 407 outputs "1" (indicating missing marker) while the system frame signal is "1", the NAND gate 408 produces "0" when it receives a clock "1" on the signal line 14-3 (with the assumption that the flip-flop 410 outputs "1" at its Q-output), and clears the FIFO memory 401, counter 406 and flip-flops 404 and 410. Consequently, both outputs of the flip-flops 404 and 410 become "0" to inhibit the AND gates 403 and 409, thus preventing the supply of the write and read-clocks to the FIFO memory 401. After that, when a frame pulse is supplied over the signal line 34, it sets the flip-flop 404 through the inverter 405, then inhibition of the AND gate 403 is released so that writing to the FIFO memory 401 is restored. At this time, reading is still inhibited, and is kept inhibited until certain amount of data determined by the counter 406 is stored into the empty FIFO memory 401. Upon recurrence of writing, the counter 406 which has been kept cleared starts to count the write-clock. When the count reaches a predetermined value, a carry output CY of the counter 406 becomes "1", and it is inverted to "0" by the inverter 412 and supplied to a count enable terminal EN of the counter 406 for inhibiting the count operation. Then the counter 406 stops and keeps the state (with CY="1"). The carry output CY of the counter 406 is connected to a data input terminal D of the flip-flop 410, and subsequently, when the signal line 14-4 is initially given a system timing frame pulse the flip-flop 410 is set to "1", releasing the inhibition of the AND gate 409 and NAND gate 408 and restarting the read operation. The read and write operations will proceed normally so far as the NAND gate 408 does not detect an inconsistent frame phase relationship. The number of clocks counted by the counter 406 is determined in consideration of the read and write speeds, so that overflow and underflow do not occur in the FIFO memory 401. For example, the counter 406 is arranged by employment of a commercially available 4-bit binary counter for counting up to 15. The connection from the flip-flop 410 to the NAND gate 408 is to prevent the reset operation of the FIFO memory 401 and other devices after the FIFO memory 401 has restarted writing and before it restarts reading.

Figure 7:
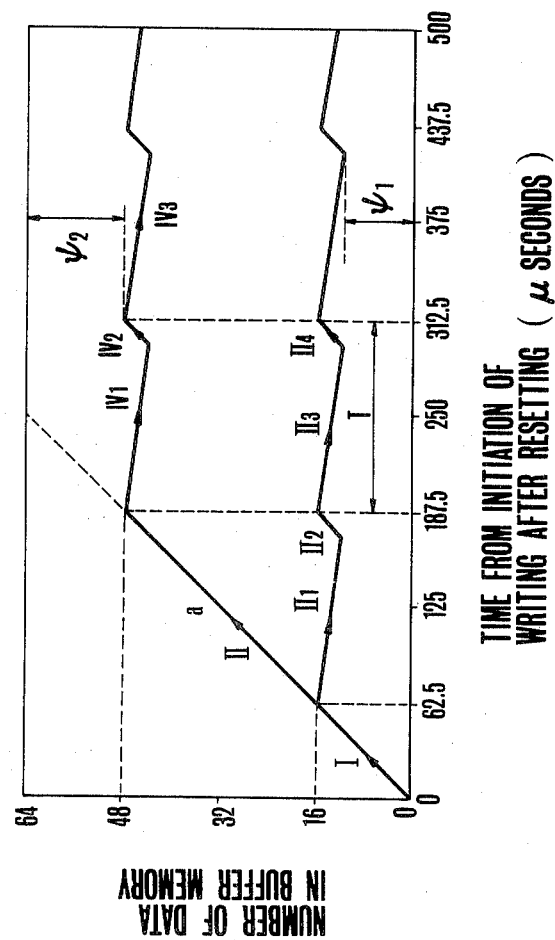
FIG. 7 is a graph showing time variations in the number of data stored in a buffer memory of the asynchronous write and read memory circuit.

The amount of data within the FIFO memory 401 varies with time as shown in FIG. 7 and normally, this memory is operable without causing buffer overflow and/or buffer underflow. It is assumed in FIG. 7 for explanation simplicity that the input samples are written at a rate of 256 kHz resulting from uniform distribution of 32 time slots within the 8 kHz frame and the 32 written samples are read out at a rate of 288 kHz within the 8 kHz frame. It is also assumed that the memory has a capacity corresponding to 64 samples and the counter 406 counts up to 16 counts. The number of data contained in the FIFO memory 401 is zero immediately after resetting. When the writing is restarted, the number of samples in the buffer memory increases along a straight line I shown in FIG. 7 at a rate of about $256 \times 10^3$ samples/sec. With the sample number reaching 16, the read-out operation is ready for starting. However, the actual starting point is determined dependent on the phase difference between the write frame and the read frame and hence variable within a range of one frame. Where the read frame begins as soon as the sample number within the FIFO memory reaches 16, straight line segments $II_1$, $II_2$, $II_3$, ... are traced by variation in the number of samples within the memory. More specifically, the write operation is carried out at a rate of $256 \times 10^3$ samples/sec. and concurrently therewith the read operation is effected at a rate of $288 \times 10^3$ samples/sec. so that the amount of data within the buffer memory is decreased at a rate of $(288-256) \times 10^3$ samples/sec. However, following reading 32 samples, the read operation is temporarily stopped until the subsequent read frame resumes and it follows that the data number within the memory is again increased at a sloping determined by segment $II_2$. Subsequently, a similar operation as tracing segments $II_1$ and $II_2$ is repeated.

Where the read frame does not start with the sample number reaching 16, the amount of data increases along segment II. Then, the read frame starts at a point a and from this point, the data number repeats variations as tracing segments $II_1$, $II_2$, $II_3$ and $II_4$. When the read frame is delayed by a maximum of one frame, segments $IV_1$, $IV_2$, $IV_3$... are traced. As far as tolerances $\psi_1$ and $\psi_2$ of the buffer memory as shown in FIG. 7 are positive, normal operation continues. In the event of an accidental abnormal operation, it is possible, as will be seen from FIG. 7, to recover normal operation by resetting. The tolerances $\psi_1$ and $\psi_2$ are effective to absorb jitters contained in the input signal.

As described above, the present invention can provide a compact and economical PCM signal interface apparatus by using the buffer circuit wherein the marker signals indicating the frame and multi-frame positions are inserted at the head of the frame of a PCM reception signal when it is written into the asynchronous write and read memory circuit 309, the multi-frame marker signal is extracted from the output read out of the asynchronous write and read memory circuit 309 so as to clear or set the multi-frame counter of counters 315 and 316 periodically to a predetermined value, and writing of the random access memory 311 for channel alignment conversion for the signaling bits and sampling-interpolation which is driven by the common address signal for the random access memory 310 for PCM channel alignment conversion is controlled by the multi-frame counter.

What is claimed is:
1. A PCM signal interface apparatus comprising:
 a buffer memory into which PCM signals may be asynchronously written and from which said PCM signals may be asynchronously read wherein said buffer memory receives writing clock signals and reading clock signals;
 means coupled to said buffer memory for inserting frame marker s to said PCM signal s upon writing said PCM signal s into said buffer memory;

means, coupled to said buffer memory for determining if said frame markers are contained in output signal s from said buffer memory upon the occurrance of an external read frame position designating pulse;

means coupled to said buffer memory for resetting the contents of said buffer memory and temporarily stopping writing clock signals and reading clock signals to said buffer memory when at least one of said frame markers is not delivered out at a predetermined time;

means coupled to said buffer memory for resuming said writing clock signals to said buffer memory upon receipt of a write frame position designating pulse; and means coupled to said buffer memory for resuming said reading clock signals to said buffer memory upon receipt of said external read frame position designating pulse at a predetermined time lapse after said resumption of said writing clock signals;

whereby the data written into said buffer memory can be read out at a desired frame phase and rate without duplicating and missing data.

2. A PCM signal interface apparatus according to claim 1 wherein said buffer memory is a FIFO memory.

3. A PCM signal interface apparatus according to claim 1 wherein said frame markers comprise a plurality of bits, one bit of which normally has a binary logic opposite to the remaining bits and is inverted to the same binary logic as that of said remaining bits in response to an external multi-frame position designating pulse.

4. A PCM signal interface apparatus according to claim 3 further comprising a code detector connected to the outputs of said buffer memory, wherein said frame marker bits are input to said code detector, and a logic circuit having one input connected to receive said external read frame position designating pulse, said logic circuit being coupled to the output of said code detector and a reset terminal of said buffer memory.

5. In a PCM signal interface apparatus comprising a transmission line code converter circuit for receiving PCM reception signals, a reception PCM timing circuit coupled to said transmission line code converter for receiving an output signal therefrom, and a buffer circuit coupled to said transmission line code converter and said reception PCM timing circuit, including a buffer memory that obtains PCM signals from said transmission line code converter and said reception PCM timing circuit, said buffer circuit undergoing write control and read control by output signals from said reception PCM timing circuit and output signals from a system timing circuit, respectively, so that said buffer circuit provides a first output signal which is a PCM signal derived from said PCM reception signals, and a second output signal which is interpolated signaling information derived from signaling information extracted from said PCM reception signals, said buffer circuit comprising:

a circuit having an asynchronous write and read memory circuit, a pair of random access memories coupled to said asynchronous write and read memory circuit for providing PCM channel alignment conversion to obtain said first output signal driven by an identical address signal supplied from said system timing circuit in response to an output signal from said asynchronous write and read memory circuit and to obtain said second output signal, and a multi-frame counter coupled to said asynchronous write and read memory circuit, whereby when said PCM reception signals are written into said asynchronous write and read memory circuit, marker signals that identify the frame position and the multi-frame position of said PCM reception signals are inserted for writing, multi-frame marker signals for synchronizing said multi-frame counter signals are extracted from an output signal of said asynchronous write and read memory circuit, and whereby writing to said pair of random access memories is controlled by said multi-frame counter.

* * * * *

UNITED STATES PATENT AND TRADEMARK OFFICE
CERTIFICATE OF CORRECTION

PATENT NO. : 4,392,234

DATED : July 5, 1983

INVENTOR(S) : Maruta

It is certified that error appears in the above-identified patent and that said Letters Patent is hereby corrected as shown below:

| COLUMN | LINE | DESCRIPTION |
| --- | --- | --- |
| 1 | 16 | Please delete "(FMD)" and insert --(FDM)--. |
| 5 | 7 | Please delete "24" and insert --25--. |

Signed and Sealed this

Seventeenth Day of September 1985

[SEAL]

Attest:

Attesting Officer

DONALD J. QUIGG

Commissioner of Patents and Trademarks—Designate